(No Model.)
A. F. SYMES & J. BUCHTEL.
S. R. HAMMER, Administrator of A. F. SYMES, Dec'd.
HOSE COUPLING.
No. 343,089. Patented June 1, 1886.
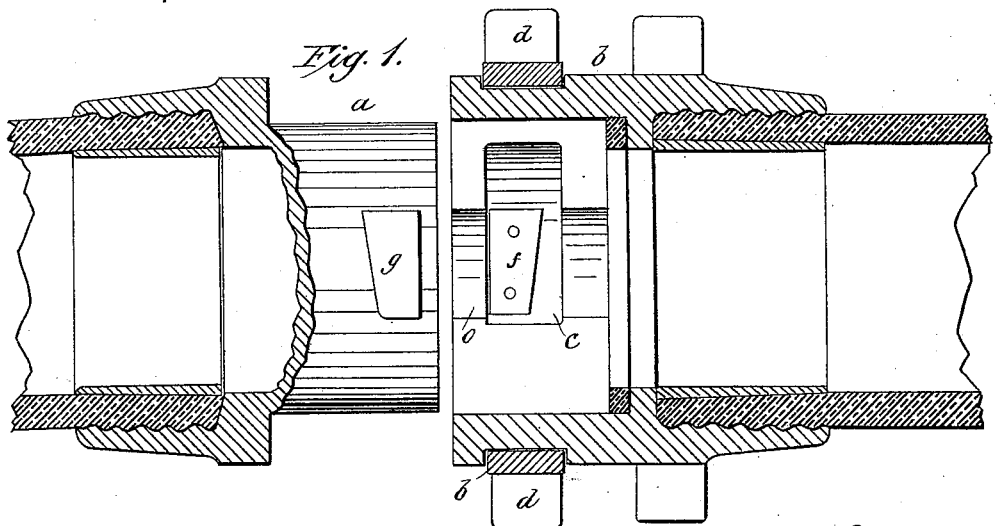
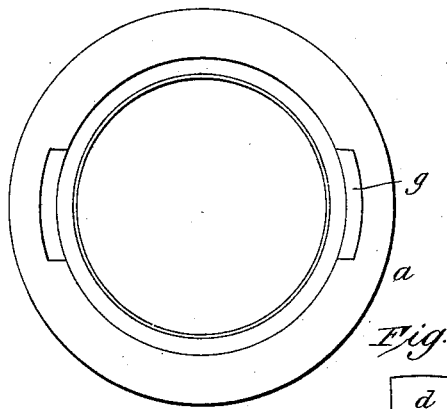
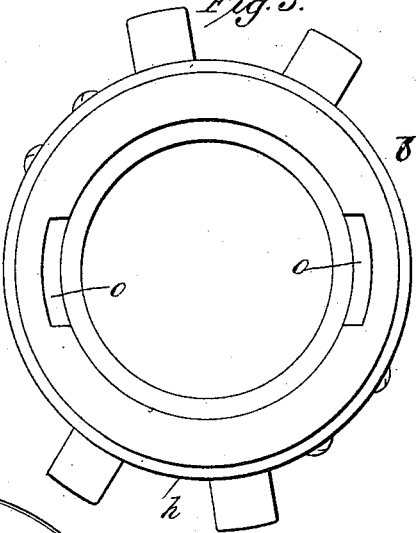
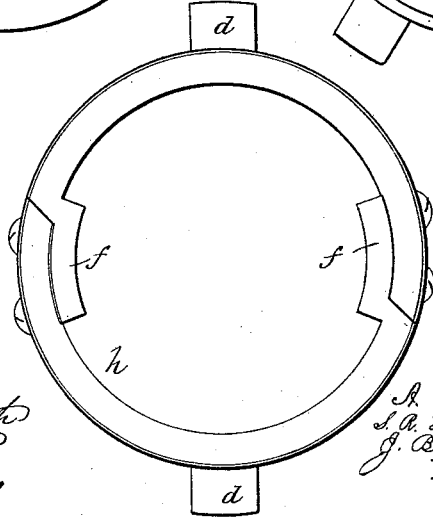
WITNESSES:
W. W. Hollingsworth
P. B. Turpin
INVENTOR:
A. F. Symes, deceased.
S. R. Hammer, Admr.
J. Buchtel
BY Munn & Co.
ATTORNEYS.

United States Patent Office.

ALBERT FREDRICK SYMES, OF SALEM, AND JOSEPH BUCHTEL, OF PORTLAND, OREGON; SETH R. HAMMER ADMINISTRATOR OF SAID ALBERT FREDRICK SYMES, DECEASED.

HOSE-COUPLING.

SPECIFICATION forming part of Letters Patent No. 343,089, dated June 1, 1886.

Application filed December 18, 1884. Serial No. 150,702. (No model.)

*To all whom it may concern:*

Be it known that we, ALBERT FREDRICK SYMES, of Salem, Oregon, and JOSEPH BUCHTEL, of Portland, Oregon, have invented an Improved Hose-Coupling, of which the following is a specification.

This invention is an improved pipe or hose coupling; and it consists in certain novel constructions and combinations of parts, as will be hereinafter described and claimed.

In the drawings, Figure 1 is a side view of a coupling, parts being broken away and others shown in section. Figs. 2 and 3 are end views of the coupling-sections, and Fig. 4 is a detail view of the ring, all of which will be described.

The coupling comprises sections $a$ and $b$, in practice properly attached to the meeting ends of two pieces of hose or other tubing it is desired to connect. The section $a$ is provided with a lug or lugs, $g$, usually two, and which preferably have their rear edges tapered, forming them into wedges. Over the section $b$ we fit a ring, $h$, which may be provided with radial pins or projections $d$, by which to facilitate the turning of such ring. The inner side of this ring is provided with one or more lugs, $f$, projected through and movable circumferentially in slots or openings $c$, formed through the section $b$. It is usual to provide the inner side of this section with grooves $o$, leading from the openings $c$ to its outer end, and adapted to receive the lugs $g$ of section $a$.

In operation, to couple the sections where the parts are as shown in Fig. 1, the ring $h$ is adjusted rotarily until its lug $f$ is out of line with groove $o$, when the section $a$ is moved into section $h$ until its lugs $g$ rest in grooves $o$ in rear of openings $c$ when the ring $h$ is adjusted, causing the lugs $f$ to engage by their rear edges the rear edges of the lugs $g$. By this construction, it will be seen, the coupling may be easily effected and released and a simple convenient construction is provided.

Having thus described our invention, what we claim as new, and desire to secure by Letters Patent, is—

A hose-coupling consisting of a section, $b$, having a radial opening, a ring fitted on said section over said opening and provided with a lug, $f$, projected through and movable circumferentially in said opening, and a section, $a$, provided with a lug, $g$, and fitted into the section $b$, with the lug $g$ in rear of and in position to be engaged by the lug $f$, substantially as set forth.

ALBERT FREDRICK SYMES.
JOSEPH BUCHTEL.

Witnesses:
JAMES C. HAVELY,
CHAS. B. TALBOT.